(12) United States Patent
Scott (10) Patent No.: US 8,960,748 B2
(45) Date of Patent: Feb. 24, 2015

(54) APPARATUS AND METHODS FOR FLANGE SUPPORT AND ALIGNMENT

(76) Inventor: Kelly W. Scott, Dunnegan, MO (US)

( * ) Notice: Subject to any disclaimer, the term of this patent is extended or adjusted under 35 U.S.C. 154(b) by 476 days.

(21) Appl. No.: 13/104,755

(22) Filed: May 10, 2011

(65) Prior Publication Data

US 2012/0286119 A1 Nov. 15, 2012

(51) Int. Cl.
*B66C 1/34* (2006.01)
*B66C 1/28* (2006.01)
*B25B 27/16* (2006.01)
*F16L 23/00* (2006.01)

(52) U.S. Cl.
CPC . *B66C 1/28* (2013.01); *B25B 27/16* (2013.01); *F16L 23/003* (2013.01)
USPC ..... 294/82.1; 294/82.13; 294/106; 248/309.1

(58) Field of Classification Search
CPC .............. B66C 1/28; B66C 1/22; B66C 1/30; F16L 23/003; B25B 27/16
USPC ............... 248/309.1, 49, 62, 65, 70, 73, 74.1; 29/272; 269/43; 294/67.2, 82.1, 82.13
See application file for complete search history.

(56) References Cited

U.S. PATENT DOCUMENTS

| | | | |
|---|---|---|---|
| 3,015,883 A | 1/1962 | Brown | |
| 3,920,232 A * | 11/1975 | Clark | 269/25 |
| 4,052,045 A | 10/1977 | Shaddix | |
| 4,662,055 A | 5/1987 | VanMeter | |
| 5,094,435 A | 3/1992 | Depperman et al. | |
| 5,228,181 A | 7/1993 | Ingle | |
| 5,560,091 A | 10/1996 | Labit, Jr. | |
| 5,707,168 A * | 1/1998 | Sharon | 403/362 |
| 5,799,408 A | 9/1998 | Sprayberry | |
| 6,484,987 B2 * | 11/2002 | Weaver | 248/278.1 |
| 6,955,224 B2 * | 10/2005 | Watson | 166/379 |
| 7,338,101 B2 * | 3/2008 | Quiroz | 294/104 |
| 7,703,215 B1 | 4/2010 | Sanchez | |
| 7,753,332 B2 * | 7/2010 | O'Keene | 248/292.14 |
| 8,434,800 B1 * | 5/2013 | LeBlanc | 294/82.1 |
| 8,434,801 B2 * | 5/2013 | LeBlanc | 294/82.13 |

OTHER PUBLICATIONS

International Search Report dated Oct. 20, 2012 Application No. PCT/US2012/033945.

* cited by examiner

*Primary Examiner* — Todd M Epps
(74) *Attorney, Agent, or Firm* — Patterson & Sheridan LLP (57) ABSTRACT

A method and apparatus for supporting and aligning a flange is provided. In one embodiment, an apparatus for supporting a flange is provided. The apparatus includes a first member having a first surface and a second surface, a first side member extending orthogonally from the first surface of the first member, a second side member extending orthogonally from the first surface of the first member in a spaced apart relation to the first side member to define a U-shaped structure, wherein each of the first side member and the second side member include an aperture formed therein along a longitudinal axis of the U-shaped structure, a lifting lug coupled to the second surface of the first member in a transverse axis of the U-shaped structure, and a plurality of set screws disposed through the first member on opposing sides of the lifting lug.

10 Claims, 5 Drawing Sheets

APPARATUS AND METHODS FOR FLANGE SUPPORT AND ALIGNMENT

BACKGROUND OF THE INVENTION

1. Field of the Invention

Embodiments of the invention generally relate to methods and apparatus for supporting and aligning a flange relative to a stationary object where the flange is to be secured. More specifically, embodiments of the invention generally relate to a method and apparatus for supporting and aligning a pipe flange relative to another flange or a tubular member, such as a joint of pipe, where the pipe flange is to be fastened.

2. Description of the Related Art

In the fabrication and rework of piping systems, it is often necessary to position flanges relative to other objects to which the flange is subsequently fastened. For example, a flange may be positioned to facilitate fastening with joints of pipe or tubing, pipe fittings, such as elbows or tees, valves, or another flange. The flange may be fastened to these objects by welding, bolts or the like, when the flange is properly positioned relative to the object. In the case of bolt-type flanges, proper positioning of the flange typically requires the bolt pattern of the to-be-installed flange to be coaxially aligned with the bolt pattern of other flanges. Additionally, in the case of pipe flanges, the mating face of the flange should be substantially normal to the longitudinal axis of the pipe. The positioning of the bolt pattern and leveling of the mating face of the to-be installed flange assures mating with other flanges on pipes, fittings or valves when the piping system is installed.

Numerous methods and devices have been employed to facilitate positioning of flanges. Conventional methods include supporting the flange from above or below the flange to be near the object where the flange is to be fastened. The flange is then manipulated by personnel to move the flange into position using body strength and/or various hand tools, such as bars, wrenches, lifting devices, and/or alignment pins. While this method may be suitable for smaller flanges, for example, flanges weighing less than 50 pounds, the method can be hazardous when positioning larger flanges. The conventional methods are also time consuming and are even more hazardous when performed in a confined space.

Thus, there exists a need in the art for a method and apparatus for supporting and aligning flanges.

SUMMARY OF THE INVENTION

Embodiments described herein relate to methods and apparatus for supporting and aligning a flange. In one embodiment, an apparatus for supporting a flange is provided. The apparatus includes a U-shaped housing having a first side plate and a second side plate, each of the first side plate and the second side plate including an aperture formed therein along a longitudinal axis of the U-shaped housing, a lifting lug coupled to a surface of the U-shaped housing in a transverse axis thereof, and a plurality of set screws disposed through the U-shaped housing on opposing sides of the lifting lug.

In another embodiment, an apparatus for supporting a flange is provided. The apparatus includes a first plate having a first surface and a second surface, a first side plate extending orthogonally from the first surface of the first plate, a second side plate extending orthogonally from the first surface of the first plate in a spaced apart relation to the first side plate to define a U-shaped housing, wherein each of the first side plate and the second side plate include an aperture formed therein along a longitudinal axis of the U-shaped housing. The apparatus also includes a lifting lug coupled to the second surface of the first plate in a transverse axis of the U-shaped housing, and a plurality of set screws disposed through the first plate on opposing sides of the lifting lug.

In another embodiment, an apparatus for supporting a flange is provided. The apparatus includes a housing having a length disposed in a longitudinal axis and a height disposed in a transverse axis; the housing comprising a first plate having a first side and a second side, a first side plate and a second side plate extending from the first side of the first plate along the transverse axis, each of the first side plate and the second side plate having a first edge coupled to the first plate and a second edge opposing the first edge, wherein the first plate maintains the first side plate and the second side plate in a spaced apart and substantially parallel relation, and a lifting lug coupled to a first portion of the second surface of the first plate along the transverse axis, wherein the first side plate includes a first aperture formed therethrough and the second side plate includes a second aperture formed therethrough, each aperture formed between the second edges and a midpoint of the first side plate and the second side plate and comprising a length that is parallel to the longitudinal axis of the housing, and the first plate comprises two set screws, each set screw being disposed on opposing sides of the lifting lug.

In another embodiment, an apparatus for supporting a flange is provided. The apparatus includes a U-shaped body having a length disposed in a longitudinal axis and a height disposed in a transverse axis. The U-shaped body comprises a first central member having a first side and an opposing second side, a first side member and a second side member extending from the first side of the first central member along the transverse axis, each of the first side member and the second side member having a first edge coupled to the first central member and a second edge opposing the first edge, wherein the first central member maintains the first side member and the second side member in a spaced apart and substantially parallel relation, and a lifting lug coupled to the second surface of the first central member along the transverse axis, wherein the first side member includes a first aperture formed therethrough and the second side member includes a second aperture formed therethrough, each aperture formed between the second edges and a midpoint of the first side member and the second side member and comprising a length that is parallel to the longitudinal axis of the U-shaped body, the first central member comprises a first set screw disposed on a first side of the lifting lug and a second set screw disposed on an opposing side of the lifting lug, and the first set screw is disposed through the first central member in a first angle and the second set screw is disposed through the first central member in a second angle that intersects with the first angle.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments of the invention generally relate to methods and apparatus for supporting and aligning a flange relative to a another object where the flange is to be secured. Some embodiments described herein relate to supporting and alignment of pipe flanges utilized in piping systems relative to pipe sections where the flange is to be secured. Embodiments of the apparatus include a flange support and alignment device that facilitates coaxial and/or concentric alignment of pipe flanges to the pipe sections. Embodiments of the invention may be utilized with pipe flanges including bolt-type flanges in the form of a plate or annular ring having a plurality of bolt holes formed in a pattern near an edge of the plate or ring. The bolt-type flanges include weld-neck flanges, raised face flanges, back-up flanges, blind flanges, slip-on flanges, lap joint flanges, socket welding flanges, threaded flanges, and the like. The apparatus and methods are particularly useful with flanges made to standards called out by American Society of Mechanical Engineers (ASME) B16.5 or ASME B16.47, as well as standards called out in the ASME Boiler and Pressure Vessel Code (B&PVC).

Figure 1:
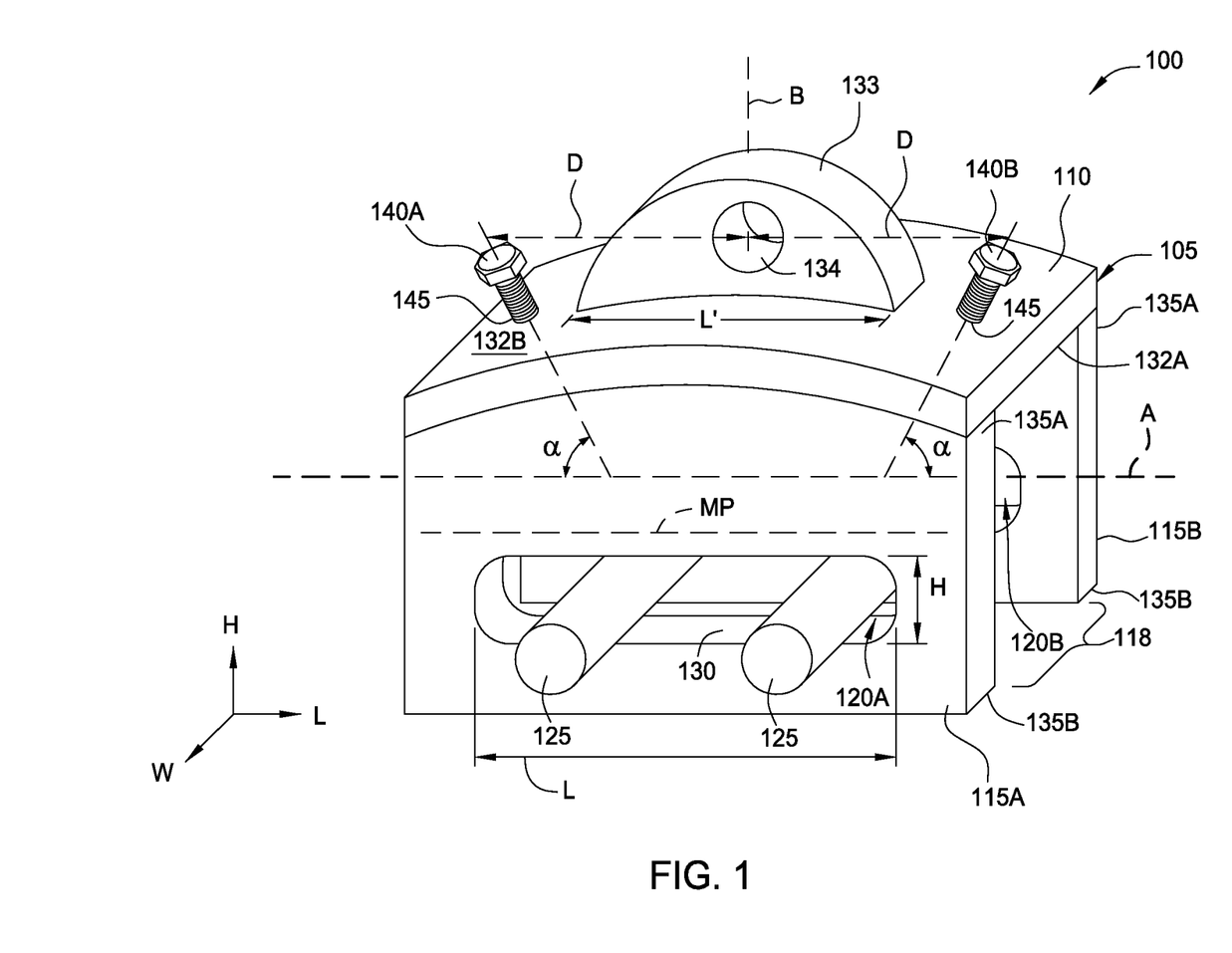
FIG. 1 is an isometric view of one embodiment of a flange support and alignment device.

FIG. 1 is an isometric view of one embodiment of a flange support and alignment device 100. The flange support and alignment device 100 includes a body 105 comprising a U-shaped housing made of a metallic material, such as steel or aluminum. The body 105 includes a first plate 110 and two side plates, such as a first side plate 115A and a second side plate 115B extending from the centrally located first plate 110. In one aspect, the body 105 comprises a general "U" shape having a gap 118 formed between interior surfaces of the first side plate 115A and the second side plate 115B. In one embodiment, the gap 118 comprises a flange receiving area to receive a portion of a flange. For example, the gap 118 is sized to receive a width dimension of a flange (not shown) between interior surfaces of the first side plate 115A and the second side plate 115B. The gap 118 is sized to allow the flange to move between the first side plate 115A and the second side plate 115B.

Each of the first side plate 115A and the second side plate 115B include an aperture 120A, 120B, respectively, formed through the plates 115A, 115B. The body 105 includes a longitudinal axis A and a transverse axis B that is orthogonal to the longitudinal axis A. The apertures 120A, 120B may be a slot or linear channel having a length L that is disposed along the longitudinal axis A of the body 105. In one embodiment, the aperture 120A formed in the first side plate 115A is formed in the same corresponding location as the aperture 120B in the second side plate 115B such that the apertures 120A, 120B are aligned in a planar orientation.

The apertures 120A, 120B are adapted to receive two support pins 125 therethrough. The support pins 125 are configured to be inserted into bolt holes of a flange (not shown) and support the flange by contacting a surface of the apertures 120A, 120B. Each aperture 120A, 120B includes a support surface 130 that is substantially parallel to the longitudinal axis A of the body 105 to allow the support pins 125 to move laterally along the longitudinal axis A. The support pins 125 are generally circular in cross-section and include a cross-sectional dimension that allows at least rotational movement of the support pins 125 in the apertures 120A, 120B along the longitudinal axis A. Each of the apertures 120A, 120B include a height H in the transverse axis B that is about 10 percent to about 25 percent greater than a diameter of each of the support pins 125. The support pins 125 may be tubular stock or solid bar stock. The support pins 125 may also comprise fasteners, such as bolts or all-thread stock. Nuts and/or washers (not shown) may also be utilized to secure the fasteners within the apertures 120A, 120B.

The first plate 110 includes a first side 132A and a second side 132B opposing the first side 132A. An attachment device 133 having a hole 134 formed therethrough, is coupled to the second side 132B. In one embodiment, the attachment device 133 is a lifting lug and the hole 134 may be centered along the longitudinal axis A and the transverse axis B. The attachment device 133 may be fixed to the second side 132B by welding or other suitable fastening method. The attachment device 133 includes a length L' that is disposed along the longitudinal axis A of the body 105.

Each of the first side plate 115A and the second side plate 115B include a first edge 135A and a second edge 135B opposing the first edge 135A. The first edge 135A is coupled to the first side 132A of the first plate 110 by welding or other suitable fastening method. Each of the plates 115A, 115B include a midpoint MP that is roughly half of a height dimension of the plates 115A, 115B and/or the body 105. In one embodiment, each aperture 120A, 120B is formed in the plates 115A, 115B between the second edge 135B and the midpoint MP of the plates 115A, 115B. The plates 115A, 115B may be sized according to the dimensions of a flange and the apertures 120A, 120B may be positioned according to the bolt center diameter (BCD) of the flange relative to the outer diameter (OD) of the flange. In one example, the distance between the center of the apertures 120A, 120B should be spaced from the first plate 110 to allow at least a 1 inch gap between the OD of the flange and an interior surface of the first plate 110 when the flange is coupled to the flange support and alignment device 100. In a specific example, for a 24 inch/300 pound flange having a 36 inch OD and a 32 inch BCD, the center of the apertures 120A, 120B are about 4 to about 6 inches from the first edge 135 of the plates 115A, 115B to provide at least about a 2 inch gap between the OD of the flange and the interior surface of the first plate 110.

The flange support and alignment device 100 also includes two adjustment devices, such as a first screw 140A and a second screw 140B. The screws 140A and 140B may be adjustable screws or bolts, such as set screws, that are coupled to threaded openings 145 formed in the first plate 110. The threaded openings 145 are formed through the second side 132B of the first plate 110 to the first side 132A of the first plate 110 to allow an end of the screws 140A and 140B to extend into the gap 118. The screws 140A and 140B may be utilized to selectively contact and provide pressure or force to a flange (not shown) that is disposed in the gap 118. In one embodiment, the threaded openings 145 are formed on opposing sides of the attachment device 133 along the longitudinal axis A of the body 105. Each of the threaded openings 145 are substantially equidistant from the transverse axis B and/or the hole 134 in the attachment device 133. In one embodiment, the threaded openings 145 are disposed in an angle α relative to the longitudinal axis A of the body 105. The angle α is an acute angle relative to the longitudinal axis A that converges toward the transverse axis B of the body 105. The first screw 140A may be disposed through the first plate 110 at a first angle α and the second screw 140B may be disposed through the first plate 110 at a second angle α, and the first angle α and the second angle α intersect. In one embodiment, the angle α is less than about 80 degrees relative to the longitudinal axis A, for example, less than about 60 degrees relative to the longitudinal axis A. In one aspect, the angle α is about 15 degrees to about 45 degrees relative to the longitudinal axis A, such as about 20 degrees to about 30 degrees relative to the longitudinal axis A.

Figure 2:
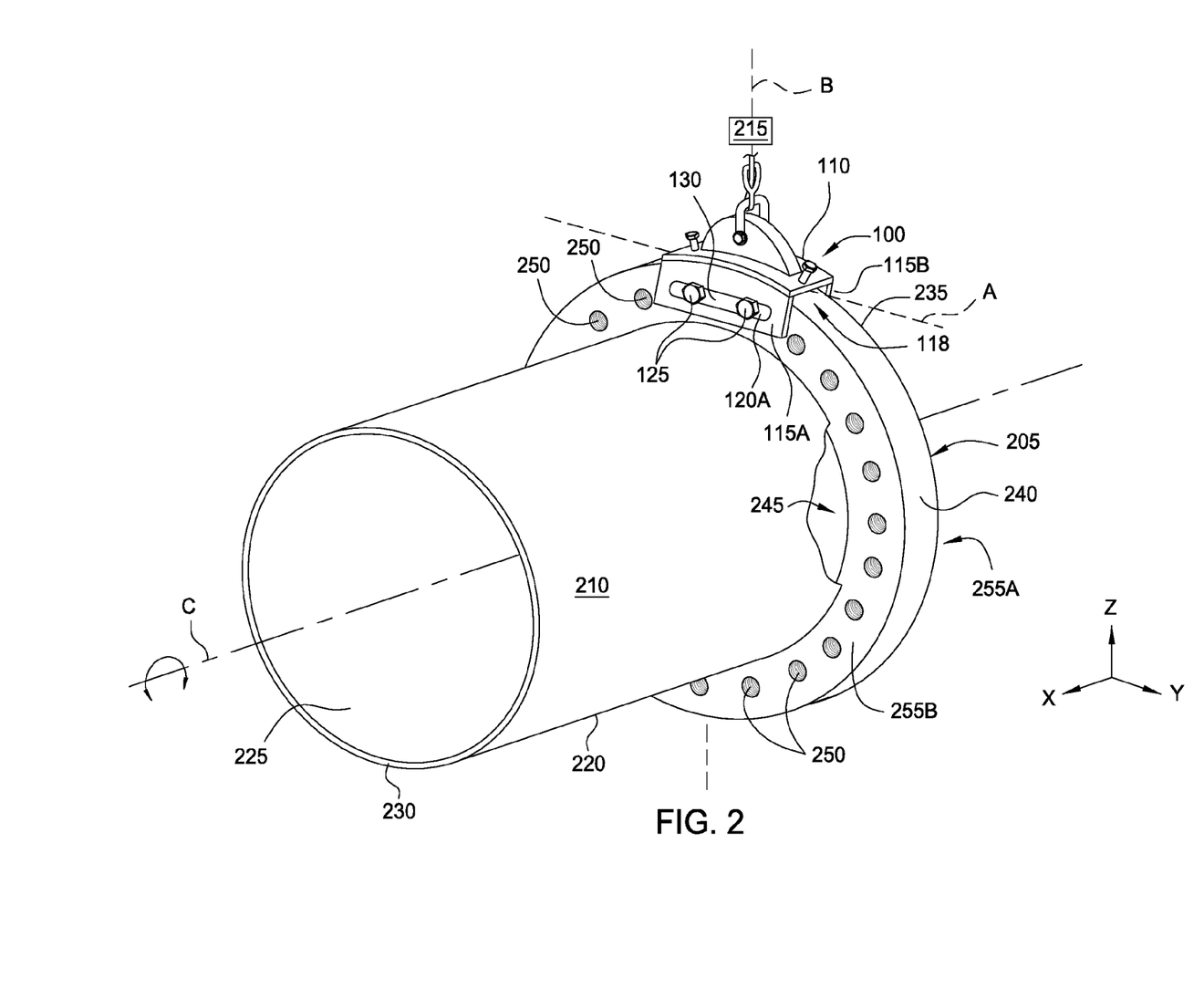
FIG. 2 is an isometric view of the flange support and alignment device of FIG. 1 supporting a flange relative to a pipe section.

FIG. 2 is an isometric view of the flange support and alignment device 100 of FIG. 1 supporting a flange 205 relative to a pipe section 210 to illustrate one embodiment of a flange alignment procedure. The flange alignment procedure includes supporting the flange 205 within the gap 118 of the flange support and alignment device 100. In this embodiment, the flange support and alignment device 100 is supporting the flange 205 relative to the pipe section 210 by a lift device 215, such as a winch, a crane, a come-along, a backhoe or trackhoe, or other lifting apparatus. The body 105 of the flange support and alignment device 100 is made of a metallic material, such as steel or aluminum, of sufficient strength and structure to support the weight of the flange 205. The body 105 may be machined from a solid block of material, forged, cast or formed from discrete plates that are subsequently joined to form a housing. The flange support and alignment device 100 is configured to stably suspend the flange 205 at least vertically (Z direction) relative to the pipe section 210. The flange support and alignment device 100 also facilitates movement of the flange 205 relative to the pipe section 210. The flange support and alignment device 100 also facilitates movement of the flange 205 relative to the body 105 of the flange support and alignment device 100.

The pipe section 210 may be a joint of pipe or a portion of a fitting, such as an elbow or tee, typically utilized in piping systems. The pipe section 210 includes an outer surface 220 and an inside surface 225 separated by a wall 230. The flange 205 includes a body 235 having an outer surface 240, a mating face 255A and an opposing mating face 255B. Depending on the flange style, the body 235 of the flange 205 may be annular and include an opening 245. The flange 205 includes a plurality of bolt holes 250 disposed through the body 235 between the mating faces 255A, 255B in positions between the outer surface 240 and the opening 245 of the body 235. The pipe section 210 may include an outside diameter of about 8 inches to about 60 inches. In the case where the style of the flange 205 is a slip-on flange, the opening 245 of the flange 205 includes an inside diameter that is slightly greater than the outside diameter of the pipe section 210. In the case where the style of the flange 205 is a weld-neck flange, the opening 245 of the flange 205 includes an inside diameter that is substantially equal to the inside diameter of the pipe section 210.

In the flange alignment procedure, the flange support and alignment device 100 is utilized to concentrically align the flange 205 relative to the pipe section 210. The flange support and alignment device 100 supports the flange 205 utilizing the two support pins 125, which are placed in adjacent bolt holes 250 (hidden in this view) of the flange 205. As the flange 205 is suspended, the support pins 125 contact a support surface 130 of the apertures 120A, 120B (120B is hidden in this view). In the suspended position, the flange 205 may be moved vertically (Z-direction) or laterally (X and/or Y direction) relative to the pipe section 210 to facilitate alignment of the flange 205 relative to a longitudinal axis C of the pipe section 210. In one aspect, the lift device 215, which is coupled to the flange support and alignment device 100, facilitates movement of the flange 205 in the vertical and lateral directions. Movement of the flange 205 in vertical and lateral directions provides concentric alignment with one or both of the outer surface 220 and the inside surface 225 of the pipe section 210. When the flange 205 is substantially aligned with the outer surface 220 and/or the inside surface 225 of the pipe section 210, the longitudinal axis C of the pipe section 210 is shared with the flange 205.

In one embodiment, the pipe section 210 is brought into level by utilizing jack stands or blocks prior to performing the flange alignment procedure. The flange alignment procedure includes leveling of the flange 205 to ensure that the mating face 255A and/or 255B of the flange 205 is substantially orthogonal to the longitudinal axis C. A spirit or bubble level (not shown) may be utilized to facilitate alignment of the flange 205. The spirit or bubble level may be a carpenter's level or a torpedo level having a bubble encased in a tube that is coupled to a planar support member. The spirit or bubble level is referred to herein as a leveling tool. The leveling tool may be disposed on the mating face 255A to facilitate leveling of the flange 205 relative to the longitudinal axis C. The leveling tool may be disposed on the mating face 255A in the Z direction and in a position substantially parallel to the transverse axis B.

The flange support and alignment device 100 as described herein is configured to facilitate leveling of the flange 205 when the flange 205 is supported by the lift device 215. For example, the gap 118 is sized slightly larger than the width of the flange 205 between the mating faces 255A, 255B. The sizing of the gap 118 provides alignment of the flange 205 along the longitudinal axis A of the flange support and alignment device 100. This allows the center of gravity of the flange 205 to be substantially within and along the longitudinal axis A, which self-centers the flange 205. When the flange 205 is centered within the gap 118, the weight of the flange 205 along the transverse axis B is equally distributed, which levels the flange 205 without further adjustment. In the situation where the flange 205 is not level and/or centered within the gap 118 along the transverse axis B, the flange 205 may be moved in the X direction relative to the plates 115A, 115B. The flange 205 may be pushed or pulled in the X direction by personnel manually or with a tool. For example, a wedge or a bar may be inserted between one of the plates 115A, 115B and one of the mating faces 255A, 255B to move the flange relative to the plates 115A, 115B.

The flange alignment procedure also includes aligning the bolt holes 250 to a specific rotational position so the bolt holes 250 coaxially align with bolt holes on other flanges. This facilitates ready alignment of the bolt holes 250 of the flange 205 with other flanges on existing portions of a piping system. The flange support and alignment device 100 facilitates the rotational alignment of the bolt holes 250 to successfully perform the flange alignment procedure. The flange support and alignment device 100 utilizes the screws 140A and 140B to rotate the flange 205 relative to the longitudinal axis C as will be explained in greater detail below.

Figure 3:
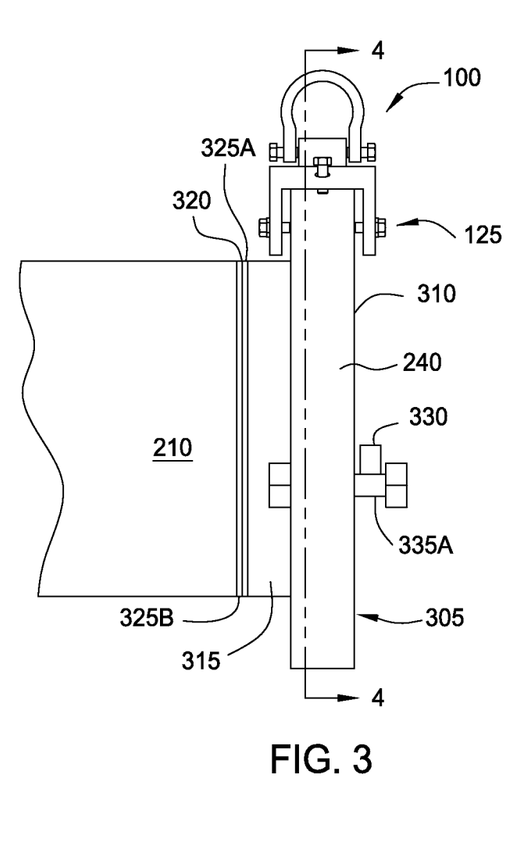
FIG. 3 is a side view of the flange support and alignment device supporting a weld-neck flange relative to a pipe section.
Figure 4:
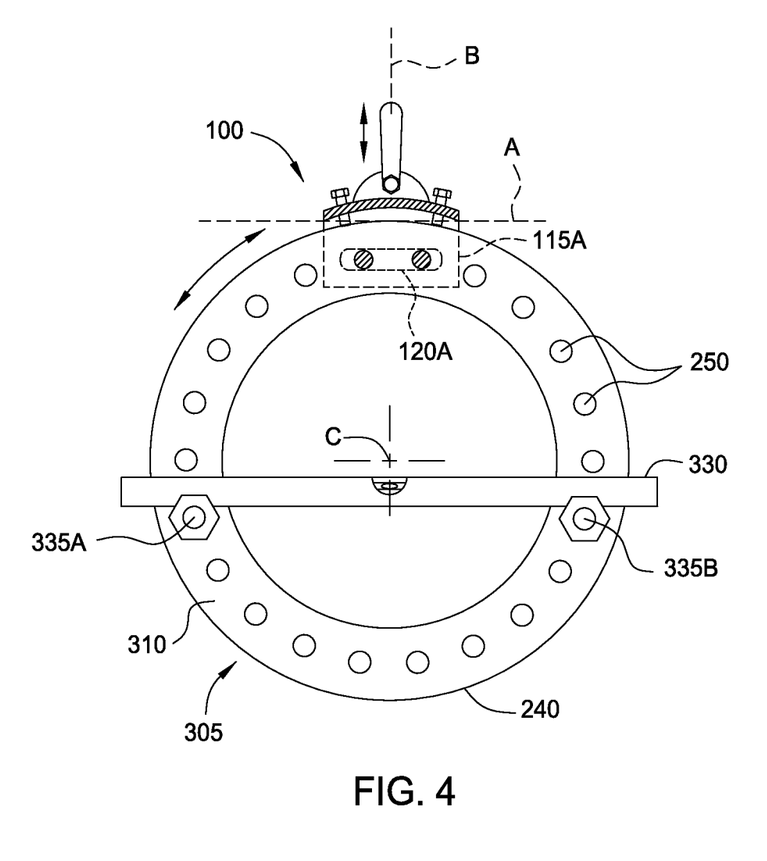
FIG. 4 is a partial cross-sectional view of the weld-neck flange and the flange support and alignment device of FIG. 3.

FIGS. 3 and 4 are various views of the flange support and alignment device 100 showing another embodiment of a flange alignment procedure. FIG. 3 is a side view of the flange support and alignment device 100 supporting a weld-neck flange 305 relative to a pipe section 210. The weld-neck flange 305 includes a body 310 that is substantially similar to the body 235 of the flange 205 of FIG. 2 with the exception of a neck portion 315 that is integral to the body 310. The neck portion 315 is configured to be welded to an end 320 of the pipe section 210 after performing the flange alignment procedure. Bevels 325A, 325B may be formed in the neck portion 315 and the pipe section 210, respectively, to facilitate welding of the pipe section 210 and the weld-neck flange 305.

A leveling tool 330 is shown adjacent the weld-neck flange 305. The leveling tool 330 may be a spirit or bubble level as described above. The leveling tool 330 is supported by at least two bolts 335A and 335B (only 335A is shown in this view) that are temporarily inserted into bolt holes 250 on opposing sides of the weld-neck flange 305.

FIG. 4 is a partial cross-sectional view of the weld-neck flange 305 and the flange support and alignment device 100 along line 4-4 of FIG. 3. The leveling tool 330 is shown adjacent the weld-neck flange 305. The positioning of the leveling tool 330 facilitates a metric of levelness in the opposing bolt holes 250. In one embodiment, proper rotational alignment of the bolt holes 250 of the weld-neck flange 305 requires that an upper surface of the bolts 335A, 335B in the opposing bolt holes 250 are level. When the upper surface of the bolts 335A, 335B in the opposing bolt holes 250 are level, the plurality of bolt holes 250 of the weld-neck flange 305 are rotated to the proper position to facilitate coaxial alignment with bolt holes on other flanges. The leveling tool 330 is used to gauge levelness of the upper surface of the bolts 335A, 335B in the opposing bolt holes 250. The leveling tool 330 may indicate that the bolt 335A is lower than the bolt 335B, which requires clockwise rotation of the weld-neck flange 305 to position the bolt holes 250 in the proper rotational alignment. Alternatively, the leveling tool 330 may indicate that the bolt 335B is lower than the bolt 335A, which requires counterclockwise rotation of the weld-neck flange 305 to position the bolt holes 250 in the proper rotational alignment. The flange support and alignment device 100 is utilized to facilitate the rotation of the weld-neck flange 305 to position the bolt holes 250 in the proper rotational alignment.

Figure 5A:
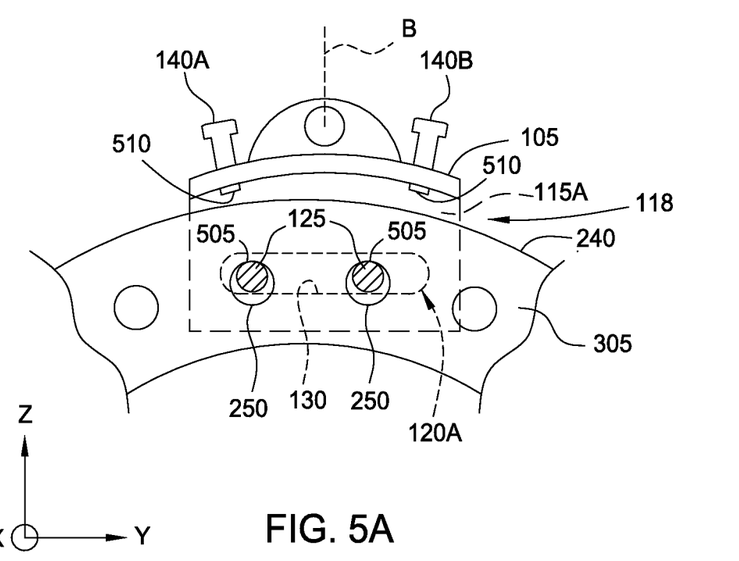
FIG. 5A shows the flange support and alignment device as it may be positioned when supporting the weld neck flange of FIG. 4.
Figure 5B:
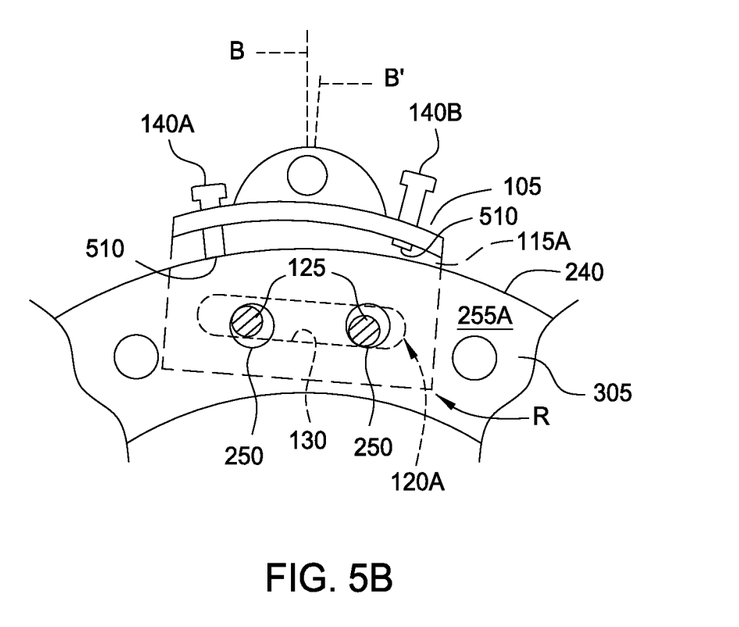
FIG. 5B shows the contact surface of the first screw contacting the outer surface of the weld-neck flange of FIG. 5A.

FIGS. 5A and 5B show the flange support and alignment device 100 supporting a portion of the weld-neck flange 305 of FIG. 4 to describe one embodiment of an adjustment procedure for adjusting the rotation of the bolt holes 250 of the weld-neck flange 305. In this example, a leveling tool 330 (not shown) indicates that the bolt 335B (shown in FIG. 4) is high. When the bolt 335B is high, clockwise rotation of the weld-neck flange 305 is required to reorient the bolt holes 250 to a proper rotational alignment.

FIG. 5A shows the flange support and alignment device 100 as it may be positioned when the leveling tool indicates that the bolt 335B (shown in FIG. 4) is high. The first side plate 115A of the flange support and alignment device 100 is shown in phantom so the bolt holes 250 of the weld-neck flange 305 are visible. The support pins 125 and the flange support and alignment device 100 facilitate support of the weld-neck flange 305 in the vertical direction. Each of the support pins 125 is in contact with an interior surface 505 of the adjacent bolt holes 250 and the support surface 130 of the aperture 120A. While not shown, the support pins 125 also contact the support surface 130 of the aperture 120B in the second side plate 115B. In this embodiment, each of the screws 140A and 140B include a contact surface 510 adapted to selectively contact the outer surface 240 of the weld-neck flange 305. Prior to attachment of the flange support and alignment device 100 to the weld-neck flange 305, both of the screws 140A and 140B may be rotated such that the contact surface 510 does not substantially extend into the gap 118. This prevents inadvertent contact with the outer surface 240 of the weld-neck flange 305 and the screws 140A and 140B, which may prevent the weld-neck flange 305 from hanging freely within the flange support and alignment device 100.

FIG. 5B shows the contact surface 510 of the first screw 140A contacting the outer surface 240 of the weld-neck flange 305. The second screw 140B may remain in the same position as shown in FIG. 5A to prevent inadvertent contact of the outer surface 240 of the weld-neck flange 305 with the contact surface 510 of the second screw 140B. In order to rotate the weld-neck flange 305 clockwise, the first screw 140A is rotated to in a direction to apply force to the outer surface 240 of the weld-neck flange 305. The force applied to the outer surface 240 of the weld-neck flange 305 causes the bolt holes 250 of the weld-neck flange 305 to rotate clockwise as the weight of the weld-neck flange 305 is caused to shift. In one aspect, rotation of the first screw 140A applies force against the outer surface 240 of the weld-neck flange 305 which causes the center of gravity of the weld-neck flange 305 to change with respect to the flange support and alignment device 100. In another aspect, rotation of the first screw 140A applies force against the outer surface 240 of the weld-neck flange 305 which causes weight of the weld-neck flange 305 to be transferred to the right side R of the flange support and alignment device 100. The shift in weight of the weld-neck flange 305 may cause the support pins 125 to move relative to the aperture 120A. In this example, the support pins 125 may move in the Y direction. The shift in weight the weld-neck flange 305 may also cause the transverse axis B of the flange support and alignment device 100 to shift (shown as B'). Rotation of the weld-neck flange 305 is effected when the transverse axis B is shifted to B'. The shifting of the transverse axis B to B' is based on the rate of force applied to the outer surface 240 of the weld-neck flange 305 by the first screw 140A. Thus, the rotation of the weld-neck flange 305 is smooth and steady if the rotation of the first screw 140A is steady. This allows personnel to rotate the first screw 140A incrementally while watching the leveling tool (not shown) and apply force by rotation of the first screw 140A as necessary. Rotation of the first screw 140A may be stopped when the leveling tool indicates that the upper surface of the bolts 335A, 335B (shown in FIG. 4) are level. When the upper surface of the bolts 335A, 335B are level, the bolt holes 250 of the weld-neck flange 305 are now rotated in the proper orientation, which facilitates alignment with bolt holes on other flanges in the piping system.

In this leveled position, the second screw 140B may be rotated to contact the outer surface 240 of the weld-neck flange 305 and lock the weld-neck flange 305 in this rotational orientation. This prevents any rotation of the weld-neck flange 305 during subsequent handling of the weld-neck flange 305. Once the mating face 255A of the weld-neck flange 305 is properly leveled and the bolt holes 250 are in the proper rotational orientation, the weld-neck flange 305 may be tack welded to the pipe section 210 (shown in FIG. 3). The support pins 125 may be removed from the bolt holes 250 and the flange support and alignment device 100 may be removed from the weld-neck flange 305. The weld-neck flange 305 may then be welded to the pipe section 210. The adjustment method described in reference to FIGS. 5A and 5B may be reversed if the leveling tool 330 (not shown) indicates that the bolt 335A (shown in FIG. 4) is high. For example, the second screw 140B may be utilized to provide force to the outer surface 240 of the weld-neck flange 305. Rotation of the second screw 140B to provide force to the outer surface 240 of the weld-neck flange 305 causes counterclockwise rotation of the weld-neck flange 305 by a shift in weight of the weld-neck flange 305 with respect to the flange support and alignment device 100.

Figure 6:
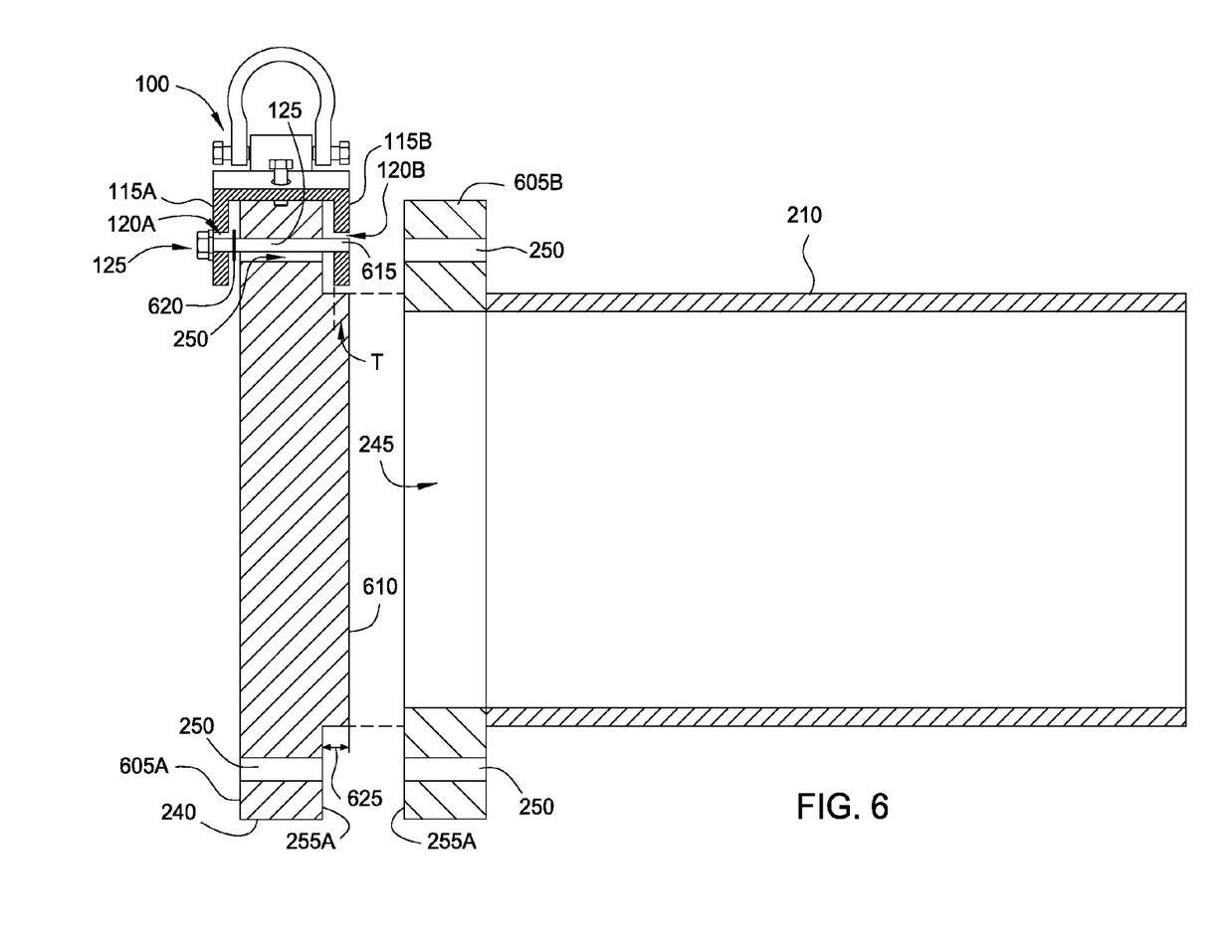
FIG. 6 is a side cross-sectional view of a first flange adjacent a second flange that is coupled to a pipe section.

FIG. 6 is a side cross-sectional view of a first flange 605A adjacent a second flange 605B that is coupled to a pipe section 210, illustrating another embodiment of a flange alignment procedure. The first flange 605A is movably supported by the flange support and alignment device 100 adjacent the second flange 605B which is stationary. Each of the first flange 605A and the second flange 605B include mating faces 255A and a plurality of bolt holes 250. In this embodiment, the first flange 605A is a blind flange having a raised face 610. The raised face 610 is offset from the mating face 255A of the first flange 605A by a distance 625. The distance 625 may be about 1/16 inches to about 3/4 inches, or greater, depending on the pressure class of the first flange 605A. When installed, the raised face 610 is adapted to be proximate the mating face 255A of the second flange 605B to facilitate a seal between the first flange 605A and the second flange 605B.

In the flange alignment procedure in this embodiment, at least the second side plate 115B of the flange support and alignment device 100 includes a thickness T that is less than or equal to the dimension D. Thus, the second side plate 115B may be in proximity to the mating face 255A of the first flange 605A and the mating face 255A of the second flange 605B during installation of the first flange 605A. Additionally, the support pins 125 may be positioned such that a distal end 615 of the support pins 125 does not extend past the outer surface of the second side plate 115B. This prevents the support pins 125 from inadvertently binding in the bolt holes 250 of the second flange 605B during alignment and positioning of the first flange 605A. A temporary fastener 620 may be coupled to the support pins 125 between the first flange 605A and the first side plate 115A to prevent the support pins 125 from falling out of the aperture 120B and/or the aperture 120A. The temporary fastener 620 may be a retaining ring or a clip that maintains the position of the support pins 125 in the first side plate 115A and the second side plate 115B. Use of a temporary fastener 620 on the support pins 125 prevents the support pins 125 from falling out of the aperture 120B or the aperture 120A, which may cause the first flange 605A to not be securely supported by the flange support and alignment device 100. Thus, use of a temporary fastener 620 prevents injuries to personnel by maintaining secure support of the first flange 605A.

The rotational orientation of the bolt holes 250 of the second flange 605B may not be altered due to the second flange 605B being coupled to the pipe section 210. Therefore, the bolt holes 250 of the first flange 605A should be rotated to match the rotational orientation of the bolt holes 250 of the second flange 605B to facilitate coupling of the first flange 605A and the second flange 605B. The flange support and alignment device 100 may be utilized to support the first flange 605A relative to the second flange 605B. The flange support and alignment device 100 may also be utilized to position the bolt holes 250 of the first flange 605A in a rotational orientation to match the rotational orientation of the bolt holes 250 of the second flange 605B. The bolt holes 250 of the first flange 605A may be rotated as described in FIGS. 5A and 5B. In this embodiment, a leveling tool may not be utilized and proper rotational alignment of the bolt holes 250 of the first flange 605A may be determined visually. For example, the bolt holes 250 of the second flange 605B may be seen through the bolt holes 250 of the first flange 605A. Any misalignment in the bolt holes 250 may be determined by visual observation. If the bolt holes 250 of the first flange 605A need to be rotated clockwise, the screw 140A may be rotated to provide force to the outer surface 240 of the first flange 605A to rotate the first flange 605A clockwise. If the bolt holes 250 of the first flange 605A need to be rotated counterclockwise, the screw 140B may be rotated to provide force to the outer surface 240 of the first flange 605A to rotate the first flange 605A counterclockwise.

Embodiments of the flange support and alignment device 100 as described herein provide controlled support and rotation of pipe flanges to facilitate fitting and proper alignment of a pipe flange. The flange support and alignment device 100 is configured to safely suspend a flange during transport and fitting procedures, which minimizes injury of personnel. The flange support and alignment device 100 also facilitates controlled rotation of a flange with minimal effort. This may decrease the number of personnel required in a fitting procedure as well as minimize the physical effort of personnel to rotate the flange to a proper orientation.

While the foregoing is directed to embodiments of the invention, other and further embodiments of the invention may be devised without departing from the basic scope thereof.

What is claimed is:

1. An apparatus for supporting a flange, comprising:
a first plate having a first surface and a second surface;
a first side plate extending orthogonally from the first surface of the first plate;
a second side plate extending orthogonally from the first surface of the first plate in a spaced apart relation to the first side plate to define a U-shaped housing, wherein each of the first side plate and the second side plate include an aperture formed therein along a longitudinal axis of the U-shaped housing, each aperture comprising a support surface that is substantially parallel to the longitudinal axis of the U-shaped housing;
a lifting lug coupled to the second surface of the first plate in a transverse axis of the U-shaped housing; and
a plurality of set screws disposed through the first plate on opposing sides of the lifting lug.

2. The apparatus of claim 1, wherein each of the first side plate and the second side plate comprise:
a first edge that is coupled to the first plate;
a second edge opposing the first edge; and
a midpoint defined between the first edge and the second edge.

3. The apparatus of claim 2, wherein each aperture in the first side plate and the second side plate is formed between the second edge and the midpoint.

4. The apparatus of claim 1, further comprising:
two support pins disposed through the apertures.

5. The apparatus of claim 1, wherein the first plate is curved.

6. The apparatus of claim 1, wherein the plurality of set screws comprises a first set screw and a second set screw, and each of the first set screw and the second set screw are disposed at an angle through the first plate.

7. The apparatus of claim 6, wherein the first set screw is disposed in a first angle and the second set screw is disposed in a second angle that intersects with the first angle.

8. The apparatus of claim 6, wherein the angle is less than 80 degrees relative to the longitudinal axis.

9. An apparatus for supporting a flange, comprising:
a U-shaped body having a length disposed in a longitudinal axis and a height disposed in a transverse axis; the U-shaped body comprising:
- a first central member having a first side and an opposing second side;
- a first side member and a second side member extending from the first side of the first central member along the transverse axis, each of the first side member and the second side member having a first edge coupled to the first central member and a second edge opposing the first edge, wherein the first central member maintains the first side member and the second side member in a spaced apart and substantially parallel relation; and
- a lifting lug coupled to the second surface of the first central member along the transverse axis, wherein:
the first side member includes a first aperture formed therethrough and the second side member includes a second aperture formed therethrough, each aperture formed between the second edges and a midpoint of the first side member and the second side member and comprising a support surface that is parallel to the longitudinal axis of the U-shaped body;
the first central member comprises a first set screw disposed on a first side of the lifting lug and a second set screw disposed on an opposing side of the lifting lug; and
the first set screw is disposed through the first central member in a first angle and the second set screw is disposed through the first central member in a second angle that intersects with the first angle.

10. The apparatus of claim 9, wherein the position of the first aperture in the first side plate corresponds with the position of the second aperture in the second side plate.

* * * * *